April 20, 1943.　　　R. S. GRANT　　　2,317,144
WATER ELIMINATOR
Filed July 6, 1942　　　2 Sheets-Sheet 1
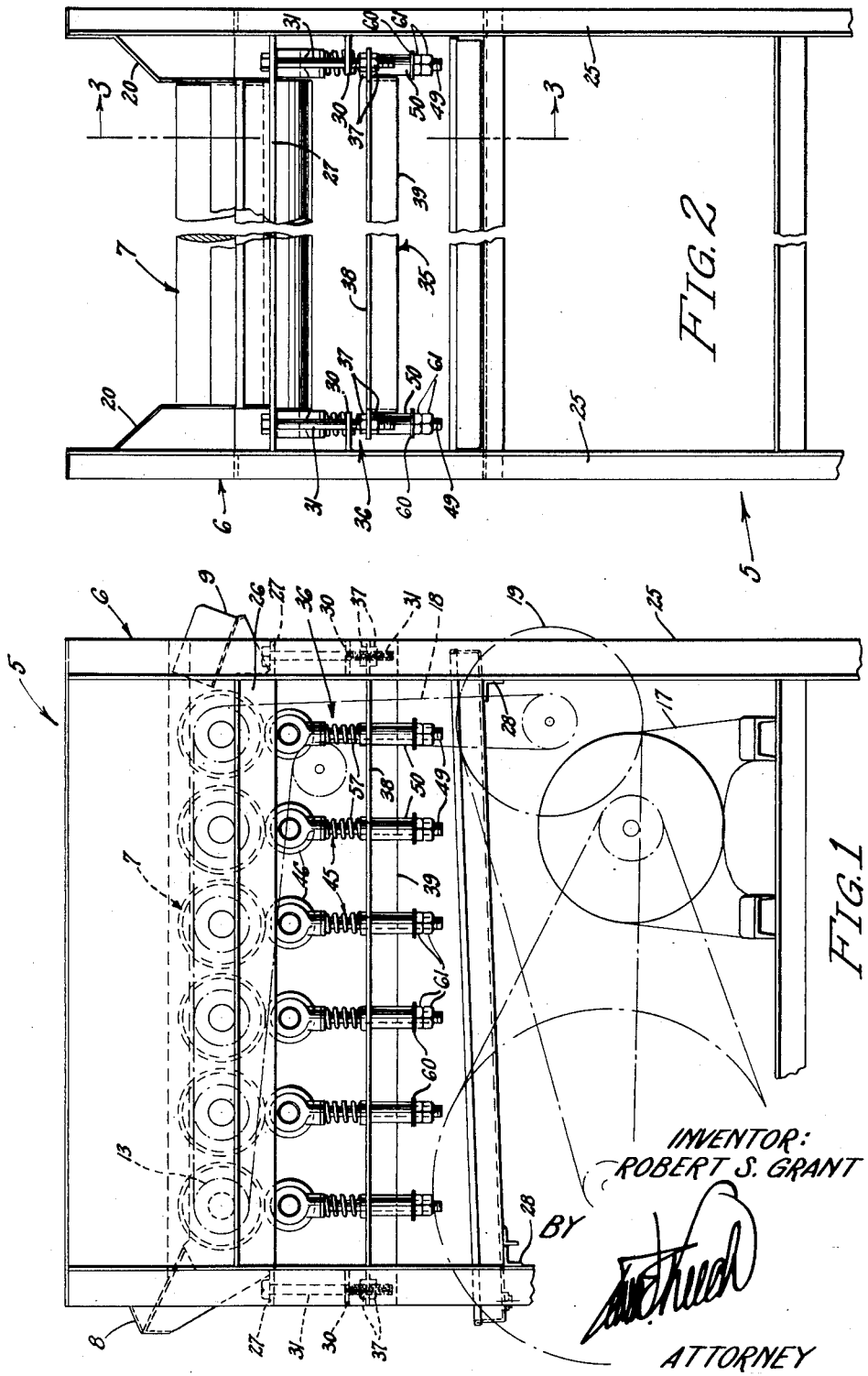

April 20, 1943.  R. S. GRANT  2,317,144
WATER ELIMINATOR
Filed July 6, 1942  2 Sheets-Sheet 2
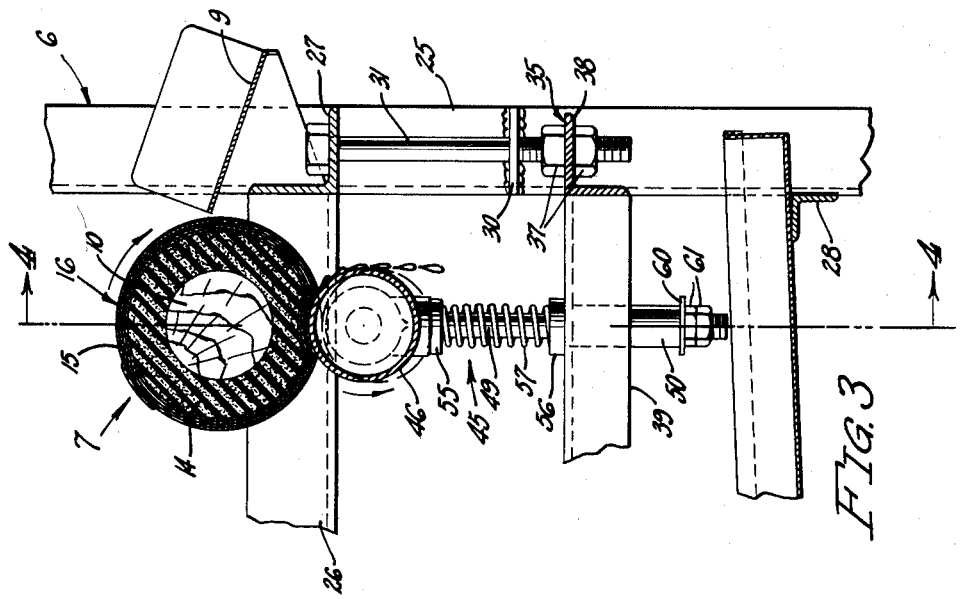
INVENTOR:
ROBERT S. GRANT
BY
ATTORNEY

UNITED STATES PATENT OFFICE 2,317,144

WATER ELIMINATOR

Robert S. Grant, Dunedin, Fla., assignor to Food Machinery Corporation, San Jose, Calif., a corporation of Delaware Application July 6, 1942, Serial No. 449,947

2 Claims. (Cl. 34—95)

This invention relates to devices for eliminating water from the external surface of rollable objects and is especially useful in the fresh fruit industry in the packing of fruits such as oranges, apples and the like.

The present invention relates particularly to that type of water eliminator in which the fruit travels in rolling contact with horizontal rollers, these generally being placed transversely of the direction of travel of the fruit and having absorbent surfaces from which water is wrung out by wringer rollers placed thereagainst. One of the problems not hitherto solved in this art has been the difficulty experienced in preventing the absorbent material on the surface of the roller from becoming matted and very hard thereby greatly reducing its capacity to absorb water quickly from the fruit.

It is an object of this invention to provide a water eliminator of the absorbent roller type in which the absorbent surface material is maintained in a highly absorbent condition.

The manner of accomplishing this object as well as further objects and advantages will be made manifest in the following description taken in connection with the accompanying drawings in which:

Fig. 1 is a diagrammatic side elevational view of a preferred embodiment of the invention.

Fig. 2 is an elevational view of Fig. 1.

Fig. 3 is an enlarged fragmentary cross sectional view taken on the line 3—3 of Fig. 2.

Fig. 4 is a cross sectional detail view taken on the line 4—4 of Fig. 3.

Referring specifically to the drawings the water eliminator 5 shown therein includes a frame 6 on which are rotatably mounted a series of absorbent rollers 7 onto which fruit is adapted to be delivered over a delivery board 8 and from which fruit is discharged over a delivery board 9.

Each roller 7 has a hard core 10 which is preferably made of wood, this core having caps 11 at its opposite ends. One of these caps of each roller is provided with a suitable bearing (not shown) while the other receives the squared end of a drive shaft 12 which is fitted with a sprocket 13.

Surrounding the core 10 of each roller 7 is a relatively thick layer of very soft rubber 14 which preferably comprises from 30% to 40% of the radius of the roller. The rubber layer 14 is preferably formed as indicated in Fig. 4 by coiling a strip of sponge rubber about core 10 and cementing this rubber in this position.

After this cement holding this rubber layer onto the core 10 has hardened, a sheet of absorbent fabric 15 is applied to the roller 7. This sheet of fabric is preferably of terry cloth or the like, is of the same width as the rubber layer 14, and is of sufficient length to be given a multiplicity of turns about the roller. Four of these turns of fabric 15 are shown as applied to each of the rollers 7 in the machine 5. To do this the inner edge of the fabric 15 is first cemented or vulcanized securely to the rubber layer 14. The roll is then rotated to wind successive turns of the fabric 15 thereabout, and these turns left free to creep on each other.

The sprockets 13 of the rollers 7 are engaged by a chain 18 through which a drive mechanism 19, diagrammatically shown in Fig. 1, rotates the rollers 7 at a uniform rate so that the upwardly disposed surfaces thereof travel toward the discharge delivery board 9. Side guards 20 on the frame 6 keep the fruit on top of the rollers 7 during its travel through the machine.

The frame 6 includes legs 25 which are connected longitudinally by angle iron members 26 and transversely by angle iron cross members 27 and 28. Extending inwardly from the legs 26, a short distance below the angle irons 27 are guide lugs 30. Extending vertically down through suitable apertures in the angle irons 27 and lugs 30 are heavy bolts 31. The lower ends of these bolts are received in holes provided in the corners of a base frame 35 of a wringer mechanism 36. Each corner of this frame is adjustably supported by nuts 37 provided on the bolts 31 above and below the horizontal flanges 38 of longitudinal members 39 of the frame base 35.

The wringer mechanism 36 includes a series of wringer units 45 each of which includes a hard wringer roller 46 with trunnions 47 journaling in bearings 48. Each of the latter have a threaded stem 49 extending downwardly through a hole in one of the flanges 38 and through a sleeve 50 welded on said flange 38 in vertical alignment with said hole. Surrounding each rod 49 is a pair of washers 55 and 56 which are held apart by a coil spring 57 disposed between these washers and also surrounding this rod. A washer 60 is placed over the bottom end of each rod 49 and nuts 61 screw onto this rod to hold the spring 57 under an adjusted degree of tension. The springs 57 are thus placed under such tension that when the frame base 35 of the wringer mechanism 36 is raised, by manipulation of nuts 37, past the amount necessary to bring the wringer rollers 46 into contact with outer absorbent layers 16 of the absorbent rollers 7, the absorbent layer as well as the rubber layer 14 therebeneath yields as shown in Fig. 3. This causes the fabric layer 16 to conform with the surface of the wringer roller 46 over a substantial area.

As previously stated it is an object of this invention to overcome the packing of the outer absorbent layer of water eliminator rollers which in prior art machines causes this layer to harden with a consequent decrease in absorbent capacity. Experimentation has shown that it is extremely difficult to avoid this packing and hardening of the outer absorbent layer of the eliminator rollers while at the same time effectively wring the water from this absorbent layer. I have accomplished this end, however, by maintaining the entire absorbent layer on each roller under a constant and substantial degree of stretching tension and then applying a hard wringer roller to this absorbent layer in such a manner as to sharply bend said layer while subjecting it to a substantial degree of compression in a direction normal to this layer.

This mode of operation is accomplished by applying the absorbent layer to the rubber layer in a plurality of spirally wound turns of fabric 15. As the absorbent roller 7 rotates with the wringer roller 46 pressed upwardly thereinto as shown in Fig. 3, each spirally wound layer or turn of the fabric 15 is stretched either against the rubber layer 14 or against the adjacent turn of fabric therebeneath until the successive layers of fabric 15 are progressively tightened and each layer by snubbing action holds the layers therebeneath in their stretched condition so that the entire absorbent layer 16 is shrunk in circumferential length to such a degree as to substantially compress the rubber layer 14. This reacts on the absorbent layer 16 to maintain it continuously in a tightly stretched condition during the operation of the eliminator 5.

This tension of the absorbent layer 16 produces an efficient wringing action when this layer is compressed between the rubber layer 14 and the wringer roller 46. At the same time the pressing of the wringer roller against the absorbent roller with a relatively high pressure so as to secure an efficient wringing action, does this without packing the absorbent layer 16. In fact the absorbent layer 16 is sharply bent each time it enters or leaves the zone of its contact with the wringer roller 46. This has a bending action on the individual fibers and strands of the fabric in the absorbent layer 16 thereby loosening up the woven structure of this layer and rendering the latter highly absorptive in character.

What I claim is:

1. In a water eliminator the combination of: an absorbent roller having a hard cylindrical core surrounded by a layer of sponge rubber the thickness of which constitutes from 30% to 40% of the radius of said roller, said roller also including a layer of absorbent fabric one edge of which is fastened to said rubber layer and said fabric then wound spirally about said rubber layer; a hard roller of smaller diameter than the aforesaid absorbent roller; means for pressing said hard roller against said absorbent roller so as to continuously effect a substantial compression of said absorbent fabric between said hard roller and said rubber layer causing said fabric and said layer to conform to said hard roller to wring water from said absorbent fabric when said absorbent roller rotates and so as to form sharp bends in said absorbent fabric where the latter enters and leaves contact with said hard roller; means for rotating said absorbent roller; and means for bringing fruit into contact with said absorbent roller while the latter is rotating so that said fruit has rolling contact with said absorbent roller.

2. In a water eliminator the combination of: an absorbent roller having a hard core surrounded by a layer of highly resilient rubber and an outer layer of absorbent fabric formed by winding a plurality of turns of said fabric about said rubber layer with the inner edge of said fabric fixed to said rubber layer; means for rotating said absorbent roller; a hard surfaced wringer roller; means for yieldingly pressing said wringer roller against said absorbent roller to cause said turns of absorbent fabric to progressively creep over the surface of said rubber layer and over each other and become stretched relatively tightly over said rubber layer so as to compress the latter, said wringer roller forcing said fabric into said compressed rubber layer in the zone of contact to produce sharp bends in said fabric layer adjacent to said zone; and means for bringing fruit into rolling contact with said absorbent roller.

ROBERT S. GRANT.